(12) United States Patent
Nann et al.

(10) Patent No.: US 11,019,127 B1
(45) Date of Patent: May 25, 2021

(54) ADAPTIVE MEDIA FRAGMENT BACKFILLING

(71) Applicant: Amazon Technologies, Inc., Seattle, WA (US)

(72) Inventors: Paul Nann, Sammamish, WA (US); Mairo Pedrini, Shoreline, WA (US); Kyle Koceski, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/522,242

(22) Filed: Jul. 25, 2019

(51) Int. Cl.
*G06F 15/16* (2006.01)
*H04L 29/06* (2006.01)
*G06F 21/60* (2013.01)
*H04L 12/861* (2013.01)

(52) U.S. Cl.
CPC ............ *H04L 65/80* (2013.01); *G06F 21/602* (2013.01); *H04L 49/90* (2013.01); *H04L 65/60* (2013.01)

(58) Field of Classification Search
CPC ......... H04L 65/80; H04L 65/60; H04L 49/90; G06F 21/602
USPC ....................................................... 709/219
See application file for complete search history.

(56) References Cited

U.S. PATENT DOCUMENTS

| | | | |
|---|---|---|---|
| 2016/0112738 A1* | 4/2016 | Kummer | H04N 21/23439 725/31 |
| 2017/0041238 A1* | 2/2017 | Do | H04L 43/0882 |
| 2017/0134465 A1* | 5/2017 | Caballero | H04L 65/60 |
| 2018/0020031 A1* | 1/2018 | Chang | H04L 65/4084 |
| 2019/0312797 A1* | 10/2019 | Sen | H04L 65/4069 |
| 2020/0195996 A1* | 6/2020 | Doner | H04N 21/44209 |

* cited by examiner

*Primary Examiner* — Wing F Chan
*Assistant Examiner* — Joseph R Maniwang
(74) *Attorney, Agent, or Firm* — Nicholson De Vos Webster & Elliott LLP

(57) ABSTRACT

Techniques for adaptive backfilling of media fragments are described. As one example, a computer-implemented method includes sending, by a media player, a request for a plurality of media fragments from a content data store, receiving the plurality of media fragments from the content data store with at least one media fragment at a first quality level into a front buffer of the media player via a network, starting playback of the plurality of media fragments from the front buffer after a startup threshold number of media fragments are received in the front buffer, detecting when a backfill threshold of the media player is exceeded by a backfill indicator, and replacing at least one of the plurality of media fragments at the first quality level in the front buffer of the media player with a second, higher quality level variant via the network when the backfill threshold is exceeded.

20 Claims, 10 Drawing Sheets

ADAPTIVE MEDIA FRAGMENT BACKFILLING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
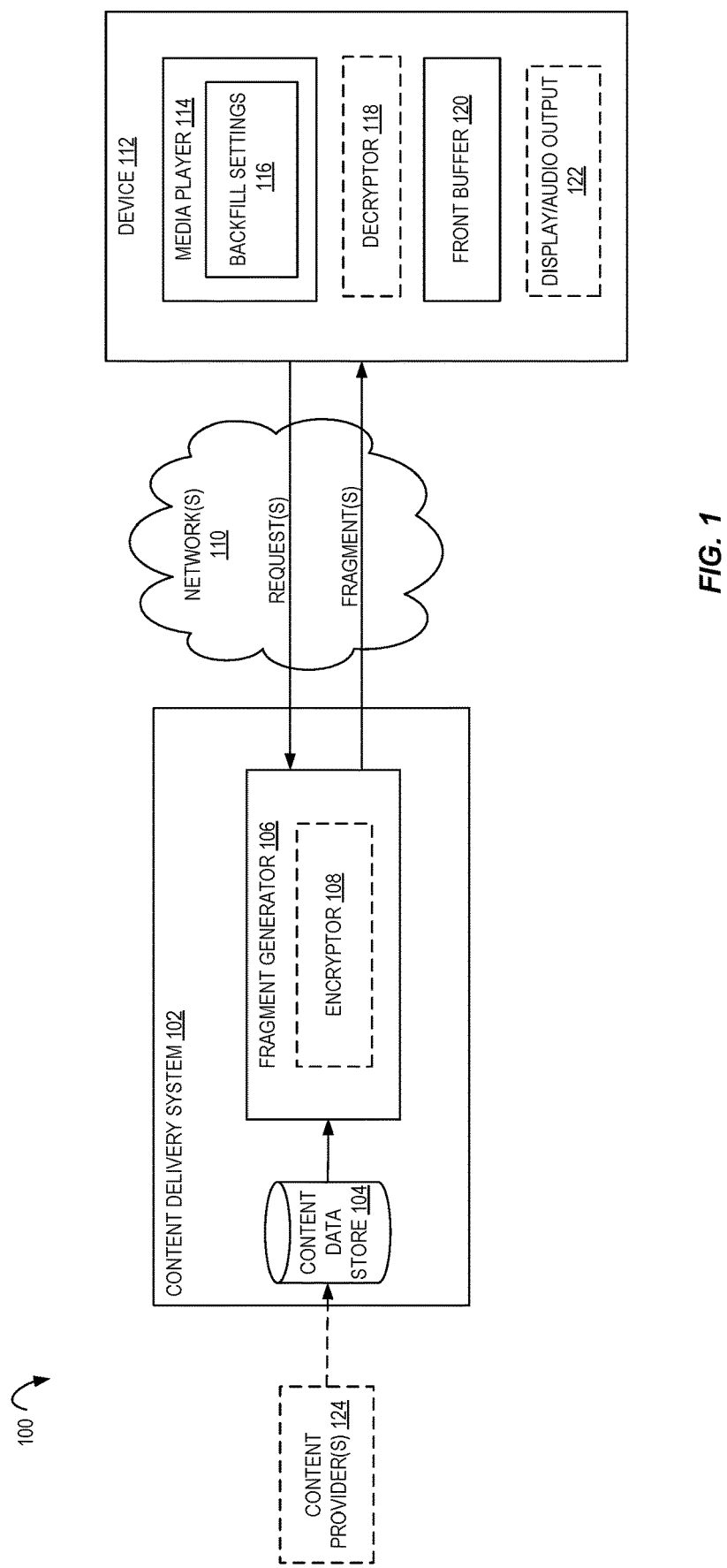
FIG. 1 is a diagram illustrating an environment including a content delivery system to generate and send media fragments to a device utilizing adaptive backfilling of media fragments according to some embodiments.

Various embodiments of methods, apparatuses, systems, and non-transitory computer-readable storage media for adaptive backfilling of media fragments are described. According to some embodiments, adaptive backfilling of media fragments enables a media player to dynamically replace previously downloaded media fragments in a front buffer of the media player with an upgraded, higher quality variant of the fragment. For example, with the decision to upgrade being based on the current buffer size (e.g., how much is downloaded), the timeline quality graph (e.g., what was downloaded), and current network conditions (e.g., what can be currently downloaded). In order to reduce the likelihood of a re-buffer (e.g., an interruption where the media cannot be acquired before it is to be played), a media player may acquire significant amounts of data before it is needed for playback (e.g., 2 minutes or more). One side-effect of this is where the media player is reacting to changing network conditions in real-time, as it downloads content, but there is latency between when it makes the decision on what to download and when it is actually viewed by the customer. Adaptive media fragment backfilling may minimize or prevent resulting media quality fluctuations including quality troughs.

With adaptive bitrate media streaming, a media file (e.g., of audio and/or video) is encoded into a number of quality levels with each one broken up into various segments (e.g., fragments). In certain embodiments, this enables a media player (e.g., of a client device or customer device) to change the media quality based on network and/or device performance. In one embodiment, if a device moves from a first (e.g., 3G) network connection to a second (e.g., Wi-Fi), faster network connection providing the fragments, the increased bandwidth now enables the media player to move from a first quality level of video (e.g., standard definition (SD) or a video bitrate of about 1200 kilobits per second (kbps)) to a second, higher quality level of video (e.g., high definition (HD) or a video bitrate of about 1200-8000 kbps, or ultra high definition (UHD) or a video bitrate of about 8000-45,000 kbps). In order to reduce the likelihood of a re-buffer (e.g., an interruption where the media cannot be acquired before it is to be played), a media player may acquire (e.g., significant amounts of) data before it is needed. In some cases, this can be up to 2 minutes or more of fragments.

One side effect of this is that a media player is reacting to changing network conditions in real-time (e.g., as it downloads content), but there is latency between when the media player makes the decision on what to download and when that media is actually displayed (e.g., viewed) on the device in one embodiment. For example, if a device switches from a first network connection (e.g., Wi-Fi) to a slower, second network connection (e.g., 3G cellular) and thus the quality level of fragments is correspondingly lowered, but only stays there for a limited time (e.g., 30 seconds) before switching back, there would be a section of (e.g., 30 seconds of) lower quality video prepared during that limited time. In that example, at a future time (e.g., a minute and a half later), the device would display (e.g., and thus a customer would see) media with a dramatic loss of quality even though their device is now connected to a network that is faster (e.g., Wi-Fi) and thus has more than enough bandwidth to support staying at a higher quality level.

Embodiments of adaptive media fragment backfilling enables a media player to dynamically upgrade previously downloaded media fragments, based on the current (e.g., front) buffer size (e.g., how much is downloaded), the timeline quality graph (e.g., the quality) of what was downloaded), and current network conditions (e.g., what can be downloaded).

FIG. 1 is a diagram illustrating an environment 100 including a content delivery system 102 to generate and send media fragments to a device 112 utilizing adaptive backfilling of media fragments according to some embodiments. The depicted content delivery system 102 includes a content data store 104, which may be implemented in one or more data centers. In one embodiment, the media file (e.g., video file) that is to be fragmented is accessed from the content data store 104 by fragment generator 106. In one embodiment, the (e.g., client) device 112 requesting the media file (e.g., fragment(s) of media) from content delivery system 102 causes the fragment generator 106 to start the fragmenting process, e.g., beginning with accessing the media file and generating the requested media fragment(s). In one embodiment, each fragment includes a plurality of video frames. In FIG. 1, fragments generated by fragment generator 106 are optionally encrypted by encryptor 108. In one embodiment, encryptor 108 encrypts a fragment under a digital copy protection standard, e.g., such that if the encryption fails, the fragment is not playable by the device 112. In certain embodiments, device 112 includes a decryptor 118 to decrypt an encrypted fragment, e.g., under a digital copy protection standard. As one example, a first, lower quality level fragment encrypted at a first time is encrypted separately from a second, higher quality level variant at a second time. As another example, a first, lower quality level fragment is not encrypted and a second, higher quality level variant is encrypted. Optionally, content provider(s) 124 may be included to provide a media file, for example, into storage in content data store 104.

In FIG. 1, content delivery system 102 is coupled to device 112 via one or more networks 110. In one embodiment, network 110 includes multiple networks having different (e.g., average or maximum) bandwidths relative to each other, for example, a cellular data network and a wireless local area network (WLAN).

Depicted device 112 includes a media player 114 having backfill settings 116, an optional decryptor 118, a front buffer 120, and an optional display and/or audio output 122. Received fragments (e.g., after decryption by decryptor 118) are stored into front buffer 120 for presentation. Display (e.g., for a video fragment) may then source a next (e.g., in order of the media to be played) fragment from front buffer 120 and/or audio output (e.g., for an audio fragment) may then source a next (e.g., in order of the media to be played) fragment from front buffer 120. In one embodiment, front buffer is implemented in physical memory of device 112 as storage for video fragments to be sourced to a display.

In certain embodiments, media player 114 includes a front buffer 120 that stores what is being shown and stores upcoming content that is going to be shown (e.g., upcoming fragments immediately ahead of a play-head indicator) on the display 122 (e.g., with the front buffer 120 being separate from a back buffer where drawing occurs and/or the back buffer not being accessible by the display). A fragment media player may be a fully-fledged fragment-level media player, for example, one that uses streaming files (e.g., MPD files) and/or container formatted files (e.g. MP4 files) for playback. In one embodiment, a fragment media player begins playing a first fragment for a media file (e.g., the start of that media file) when a startup threshold number of fragments are stored into the front buffer, e.g., and then continues playing fragments from the front buffer in order.

In certain embodiments, backfill settings 116 stores a (e.g., weighted) backfill threshold value (e.g., a preset value) used to determine whether to implement adaptive backfilling of media fragments. In one embodiment, the media player 114 generates a (e.g., weighted) backfill value to compare against the backfill threshold in backfill settings 116 based on a current number of media fragments received in the front buffer 120, quality levels of the current number of media fragments received in the front buffer 120, and current conditions of the network 110 coupling device 112 to content delivery system 102. In one embodiment, the media player 114 evaluating these three data sources every time a new fragment could be downloaded and appended to the front buffer 120. When certain thresholds (e.g., as set in backfill settings 116) are reached, for example, there is a desired number of media fragments (e.g., at least 30 seconds of media fragments) stored in the front buffer 120 and there is sufficient bandwidth on network 110 (e.g., to download 1.5× average quality level fragments), the media player 114 decides to upgrade a fragment by downloading a higher quality level variant of that fragment.

Embodiments herein of adaptive backfilling of media fragments provide significant flexibility in the heuristics used to determine when to download, what to download, and which fragment to replace. The content being played (e.g., movies vs. pre-recorded television vs. live tv vs. live sports), the device (e.g., its central processing unit (CPU) and/or memory constraints), the front buffer storage size, the native media consumption rate (e.g., how much the device/platform needs to have prepared ahead of time), the currently acquired fragments, timeline quality graph of acquired fragments, current/historical network conditions, or any combination thereof, may affect these thresholds and heuristic decision making.

In one embodiment, a media player begins playback at a lower quality level, gains confidence on the network conditions, and then slowly ramps up to the best quality available. This may result in a device user seeing low quality video for an initial time period (e.g., 30-60 seconds) before eventually reaching the maximum possible quality level for the conditions/device, even if the device has more than enough bandwidth to support higher quality video for at least a portion of the initial time period. Implementing adaptive media fragment backfilling enables embodiments of a media player to continue to use this model for starting playback, but after the startup threshold of fragments has been reached, the media player replaces fragment(s) with a higher quality level variant (e.g., the best available). Depending on how much bandwidth is available, in certain embodiments a media player utilizing adaptive backfilling of media fragments decides which fragment is to be replaced by selecting either the earliest fragment (e.g., closest to the Pt position of an input buffer having a first slot 1 and increasing in number (1, 2, . . . ) to the end of the front buffer), or the latest fragment (e.g., closest to the end of the front buffer). In one embodiment, this fragment replacement policy is set in backfill settings 116. In one embodiment, there is a device user experience benefit to having quality levels not fluctuate, which is why in the "normal" start-up case it is usually best to replace fragments in-order (e.g., from fragment 1 to the end).

In one embodiment, a media player detects dramatic and short-lived network fluctuations, resulting in short blips where for a short time bandwidth is dramatically decreased or latency is dramatically increased. In these cases, a media player may drop its quality accordingly, leading to a quality trough in the timeline quality graph where the device user would see a dramatic decrease in quality for an equally short amount of time. In this case, adaptive media fragment backfilling allows the media player to fill this trough rather than upgrade less-dramatic quality decreases (such as during startup as discussed above).

In one embodiment, media players see changes in network connectivity, such as customers going between rooms where wireless network connectivity differs, switching connectivity types (e.g., WLAN to cellular, as discussed above), or network resource contention (e.g., other users consuming bandwidth simultaneously). A media player may handle these changes by adapting their quality to match, but due to having no guarantee of future network conditions, they decide on a quality level at that point (e.g., immediately), accumulating quality level debt in cases where the bandwidth improves before the fragment is played. Adaptive media fragment backfilling allows a media player to pay back this debt while not increasing re-buffer or interruption rates by spending future bandwidth to pay for past quality decreases. In one embodiment, a media player detects a change in display type (e.g., from a lower resolution of display to a higher resolution of display) and adaptive media fragment backfilling allows the media player to react accordingly by dynamically replacing previous, lower quality fragments with higher quality variants.

FIGS. 2A-2C and 3A-3C are examples of how adaptive media fragment backfill enables increased media quality by dynamically replacing previously lower quality fragments with higher quality variants. Each example is over a given set of time and is to be read in order. These examples are generic and not based on any specific media player implementation.

In one embodiment, playback startup quality is impacted by attempting to optimize three competing metrics: quality, startup time (e.g., time to playback starting), and re-buffer/interruption rate, for example, where attempting to improve one will impact the other such that increasing quality also increases startup time and re-buffer rate. Media players often have very little information on the current network as well, meaning they cannot select the ideal quality to download. As such, embodiments of media players may start at a much lower quality than ideal, gain such information, and then ramp up to the best available quality.

Figure 2A:
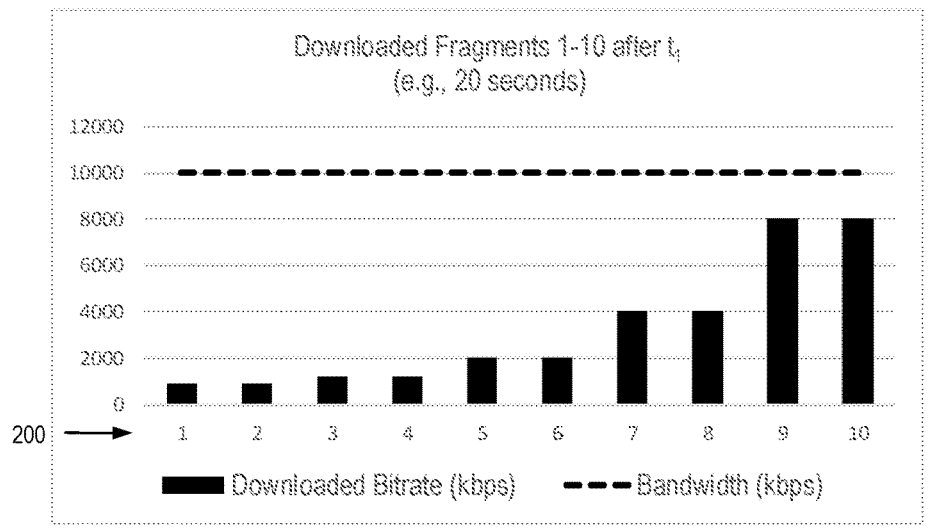
FIGS. 2A-2C are diagrams illustrating adaptive backfilling of media fragments of a front buffer according to some embodiments.
Figure 2B:
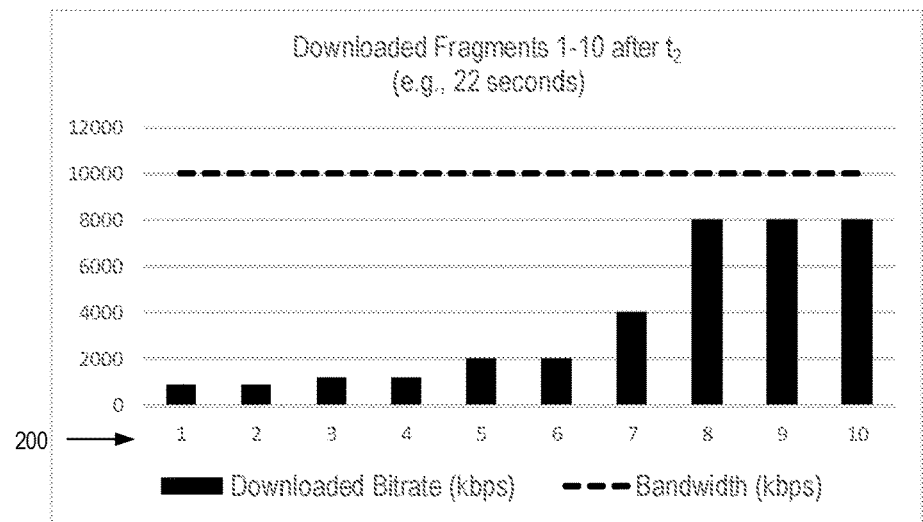
Figure 2C:
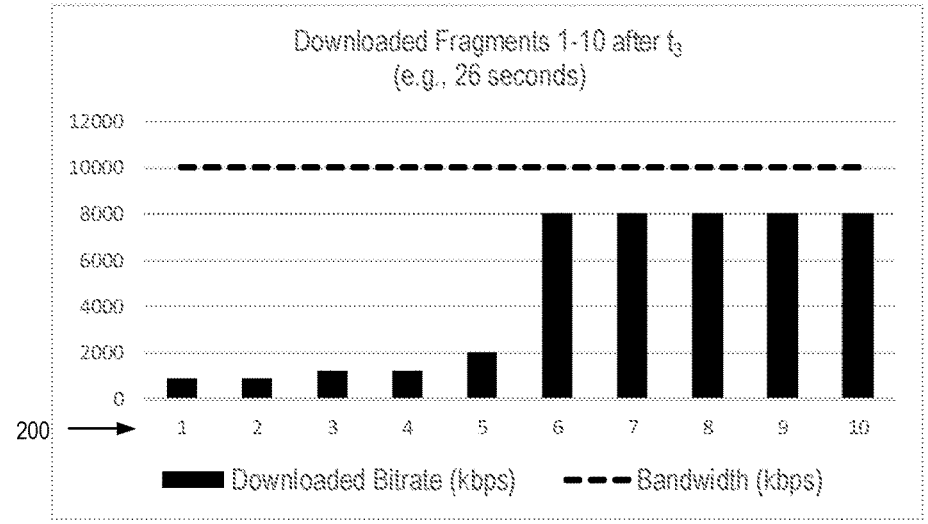

FIGS. 2A-2C are diagrams illustrating adaptive backfilling of media fragments of a front buffer 200 according to some embodiments. FIGS. 2A-2C further illustrate improved startup quality by using adaptive backfilling of media fragments in a front buffer where the media player has access to 10 megabits per second (Mbps) of bandwidth, but still slowly ramps up to the maximum quality (8 Mbps).

In FIG. 2A, ten fragments have been downloaded and stored into a front buffer into ten slots 1-10. Although a ten-slot front buffer 200 is illustrated, this is an example and any plurality of slots may be utilized. At the time illustrated in FIG. 2A, slots 1-2 include a respective fragment having a quality of 900 kbps, slots 3-4 include a respective fragment having a quality of 1200 kbps, slots 5-6 include a respective fragment having a quality of 2000 kbps, slots 7-8 include a respective fragment having a quality of 4000 kbps, and slots 9-10 include a respective fragment having a quality of 8000 kbps. The bandwidth available on the network sourcing the fragments is shown as 10,000 kbps. It should be understood these values are merely examples and other numbers may be utilized. It should also be understood that the bandwidth may vary over time.

In one embodiment, the front buffer has stored enough fragments that the media player begins playback of fragment 1 in FIG. 2A. In this embodiment, as the media player has excess bandwidth, after playing back a single fragment it has already downloaded 10 fragments total. At this point the device user has started seeing video, but at 900 kbps (a bitrate about ⅒th of the total bandwidth). Up to this point the media player (e.g., in regular adaptive bitrate mode) is downloading fragments at the end of the front-buffer, so the next fragment to be downloaded would be fragment 11 (e.g., index 11). In certain embodiments, at this point, the media player determines to utilize adaptive backfilling of media fragments (e.g., the media player switches to adaptive fragment backfill mode), as there are enough fragments stored into front buffer (e.g., fragments 2-10) and bandwidth to enable replacing a previously downloaded fragment rather than downloading the next fragment (fragment 11).

The (e.g., next) fragment to be replaced may be determined based on the desired customer experience. Depending on content and desired customer experience, the media player may decide to replace the earliest fragment that it can replace without stopping playback (e.g., fragment 3), the latest fragment (e.g., fragment 8) of a quality less than the desired quality (e.g., the quality of fragments 9-10), or the worst quality fragment (in this case, fragment 3 or 4). As shown in FIG. 2B, the media player has decided to replace the latest indexes (e.g., because the front buffer size is a relatively small 10 fragments).

In one embodiment, the media player begins playing fragment 2 from the front buffer in FIG. 2B. After a period of time (e.g., 2 seconds) has passed since the time in FIG. 2A, the media player has now played additional media (e.g., two additional seconds), and has replaced fragment 8 with a higher quality bitrate variant (e.g., 8 Mbps) in FIG. 2B. Depending on the front-buffer size, bandwidth, and distance from the currently playing fragment, the media player may decide to download fragment 11 at this point.

In one embodiment, the media player begins playing fragment 4 (after playing fragment 3) from the front buffer in FIG. 2C. After an additional time period (e.g., 4 seconds) has passed since the time in FIG. 2B, the media player has replaced an additional 2 fragments (fragment 7, then fragment 6) to the highest bitrate stored in the front buffer (8 Mbps). After playing fragment 5, the device user will now see a significant increase in quality compared to the experience without adaptive fragment backfilling, as fragments 6, 7, and 8 have been upgraded from significantly lower bitrates. Depending on the bandwidth available, a media player utilizing adaptive backfilling of media fragments may continue to backfill fragments up to as close to the currently playing fragment as possible. In one embodiment, a media player utilizing adaptive backfilling of media fragments is to not replace the current highest quality level fragment(s) with even higher quality level fragments, but is to instead replace lowest quality level fragment(s), e.g., to raise the lowest quality level instead of increasing the highest quality level of fragments in the front buffer.

There may often be cases where network conditions fluctuate throughout a playback session, leading a media player to decrease quality. This may result in quality troughs where decisions to decrease quality now result in the device user seeing a lower-quality video later once it plays fragment(s) from the trough. Adaptive fragment backfill enables the media player to pay off this quality debt with excess bandwidth in the future. In the example below, it is decided to replace fragments furthest from the currently playing fragment first. In another embodiment, e.g., fragments closest to the currently playing fragment are replaced first.

Figure 3A:
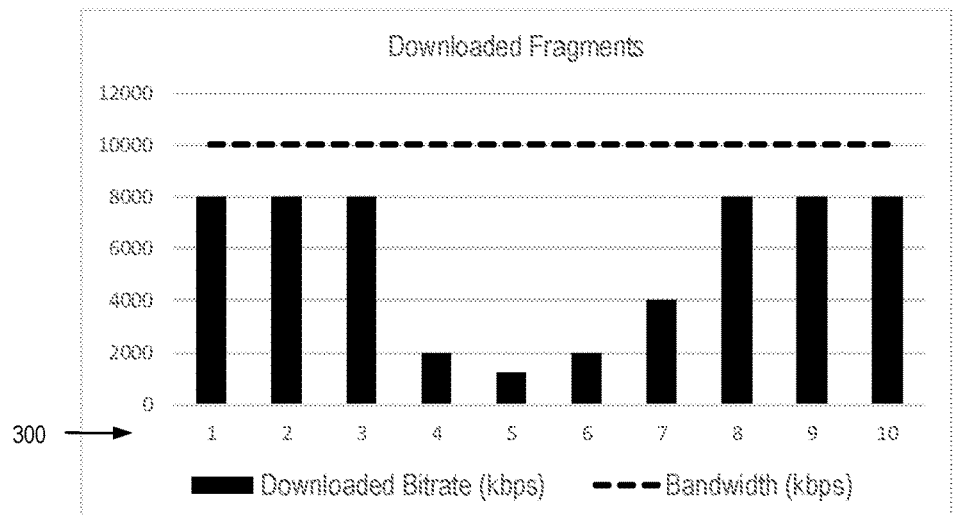
FIGS. 3A-3C are diagrams illustrating adaptive backfilling of a quality trough in media fragments of a front buffer according to some embodiments.
Figure 3B:
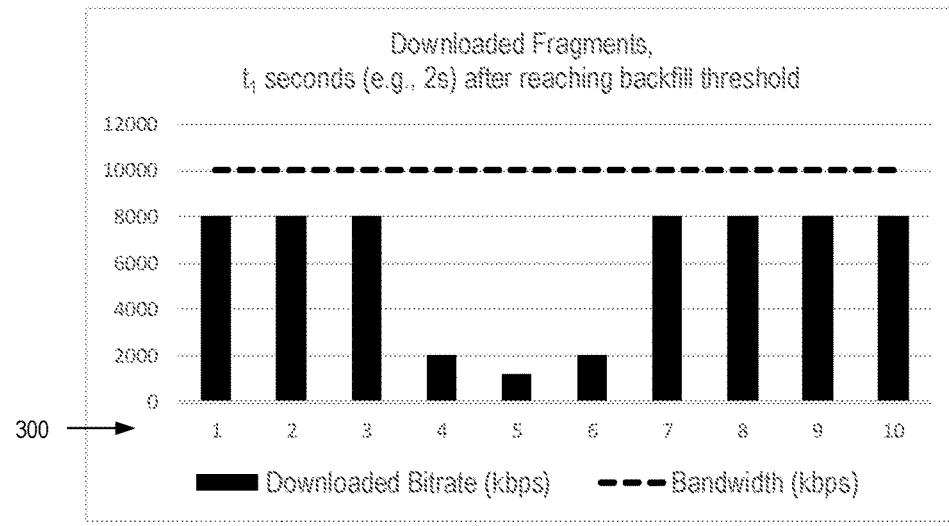
Figure 3C:
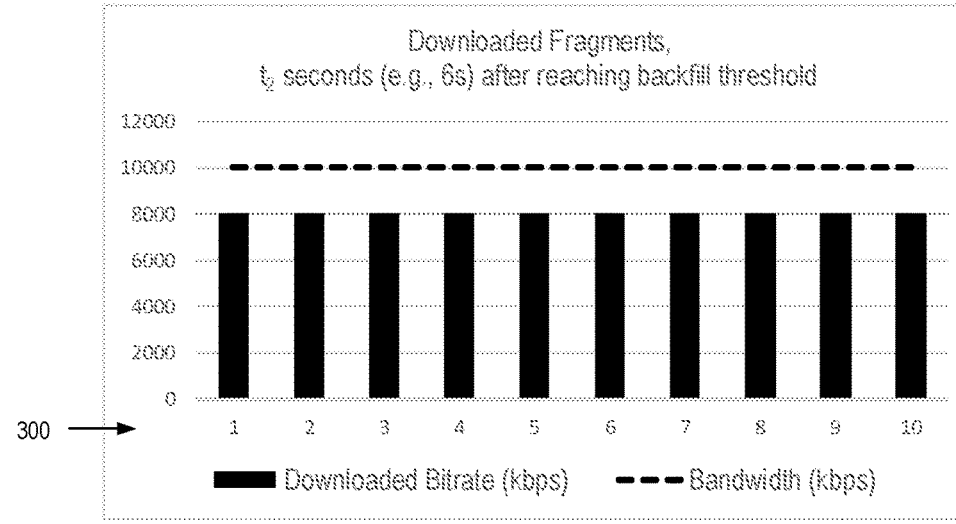

FIGS. 3A-3C are diagrams illustrating adaptive backfilling of a quality trough in media fragments of a front buffer 300 according to some embodiments. In FIG. 3A, ten fragments have been downloaded and stored into a front buffer into ten slots 1-10. Although a ten slot front buffer 300 is illustrated, this is an example and any plurality of slots may be utilized. At the time illustrated in FIG. 3A, slots 1-3 include a respective fragment having a quality of 8000 kbps, slots 4 and 6 include a respective fragment having a quality of 2000 kbps, slot 5 includes a respective fragment having a quality of 1200 kbps, slot 7 includes a respective fragment having a quality of 4000 kbps, and slots 8-10 include a respective fragment having a quality of 8000 kbps. The bandwidth available on the network sourcing the fragments is shown as 10,000 kbps. It should be understood these values are merely examples and other numbers may be utilized. It should also be understood that the bandwidth may vary over time.

In one embodiment, the front buffer has stored enough fragments that the media player begins playback of fragment 1 in FIG. 3A. In this embodiment, as the media player has excess bandwidth, after playing back a single fragment it has already downloaded 10 fragments total. At this point the device user has started seeing video at 8000 kbps. Up to this point the media player (e.g., in regular adaptive bitrate mode) is downloading fragments at the end of the front-buffer, so the next fragment to be downloaded would be fragment 11 (e.g., index 11). In certain embodiments, at this point, the media player determines to utilize adaptive backfilling of media fragments (e.g., the media player switches to adaptive fragment backfill mode), as there are enough fragments stored into front buffer (e.g., fragments 3-10) and bandwidth to enable replacing a previously downloaded fragment rather than downloading the next fragment (fragment 11).

The (e.g., next) fragment to be replaced may be determined based on the desired customer experience. Depending on content and desired customer experience, the media player may decide to replace the earliest fragment from the trough that it can replace without stopping playback (e.g., fragment 5), the latest fragment (e.g., fragment 7) from the trough of a quality less than the desired quality (e.g., the quality of fragments 9-10), or the worst quality fragment (in this case, fragment 5). As shown in FIG. 3B, the media player has decided to replace the latest indexes from the trough (e.g., because the front buffer size is a relatively small 10 fragments).

In one embodiment, the media player begins playing fragment 2 from the front buffer in FIG. 3B. After a period of time (e.g., 2 seconds) has passed since the time in FIG. 3A, the media player has now played additional media (e.g., two additional seconds), and has replaced fragment 7 with a higher quality bitrate variant (e.g., 8 Mbps) in FIG. 3B. Depending on the front-buffer size, bandwidth, and distance from the currently playing fragment, the media player may decide to download fragment 11 at this point.

In one embodiment, the media player begins playing fragment 3 from the front buffer in FIG. 3C. After an additional time period (e.g., 4 seconds) has passed since the time in FIG. 3B, the media player has replaced an additional 3 fragments (fragment 6, then fragment 5, and finally, fragment 4) to the highest bitrate stored in the front buffer (8 Mbps). After playing fragment 3, the device user will now see a significant increase in quality compared to the experience without adaptive fragment backfilling, as fragments 4, 5, and 6 have been upgraded from significantly lower bitrates. Depending on the bandwidth available, a media player utilizing adaptive backfilling of media fragments may continue to backfill fragments up to as close to the currently playing fragment as possible. In one embodiment, a media player utilizing adaptive backfilling of media fragments is to not replace the current highest quality level fragment(s) with even higher quality level fragments, but is to instead replace lowest quality level fragment(s), e.g., to raise the lowest quality level instead of increasing the highest quality level of fragments in the front buffer.

Figure 4:
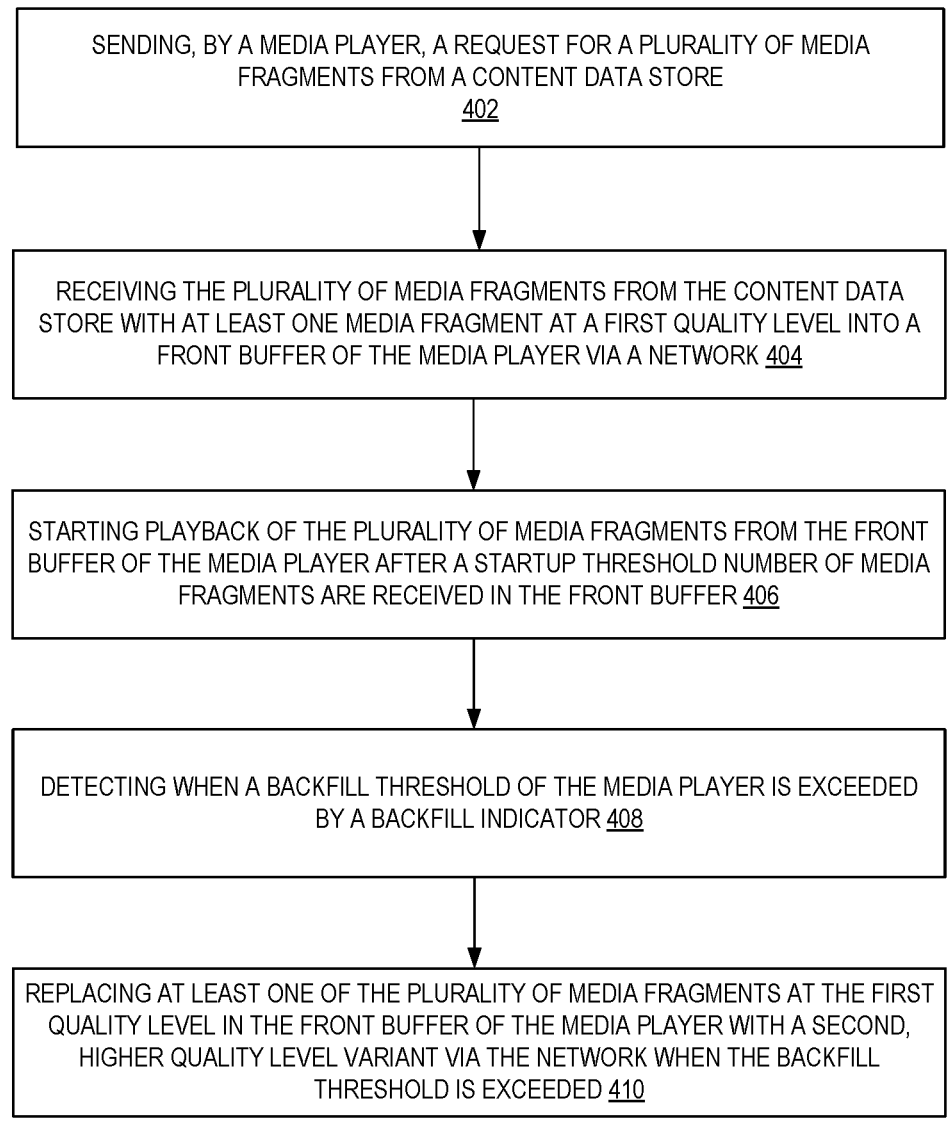
FIG. 4 is a flow diagram illustrating operations of a method for adaptive backfilling of media fragments according to some embodiments.

FIG. 4 is a flow diagram 400 illustrating operations of a method for adaptive backfilling of media fragments according to some embodiments. Depicted flow diagram 400 includes sending, by a media player, a request for a plurality of media fragments from a content data store 402, receiving the plurality of media fragments from the content data store with at least one media fragment at a first quality level into a front buffer of the media player via a network 404, starting playback of the plurality of media fragments from the front buffer of the media player after a startup threshold number of media fragments are received in the front buffer 406, detecting when a backfill threshold of the media player is exceeded by a backfill indicator 408, and replacing at least one of the plurality of media fragments at the first quality level in the front buffer of the media player with a second, higher quality level variant via the network when the backfill threshold is exceeded 410.

Figure 5:
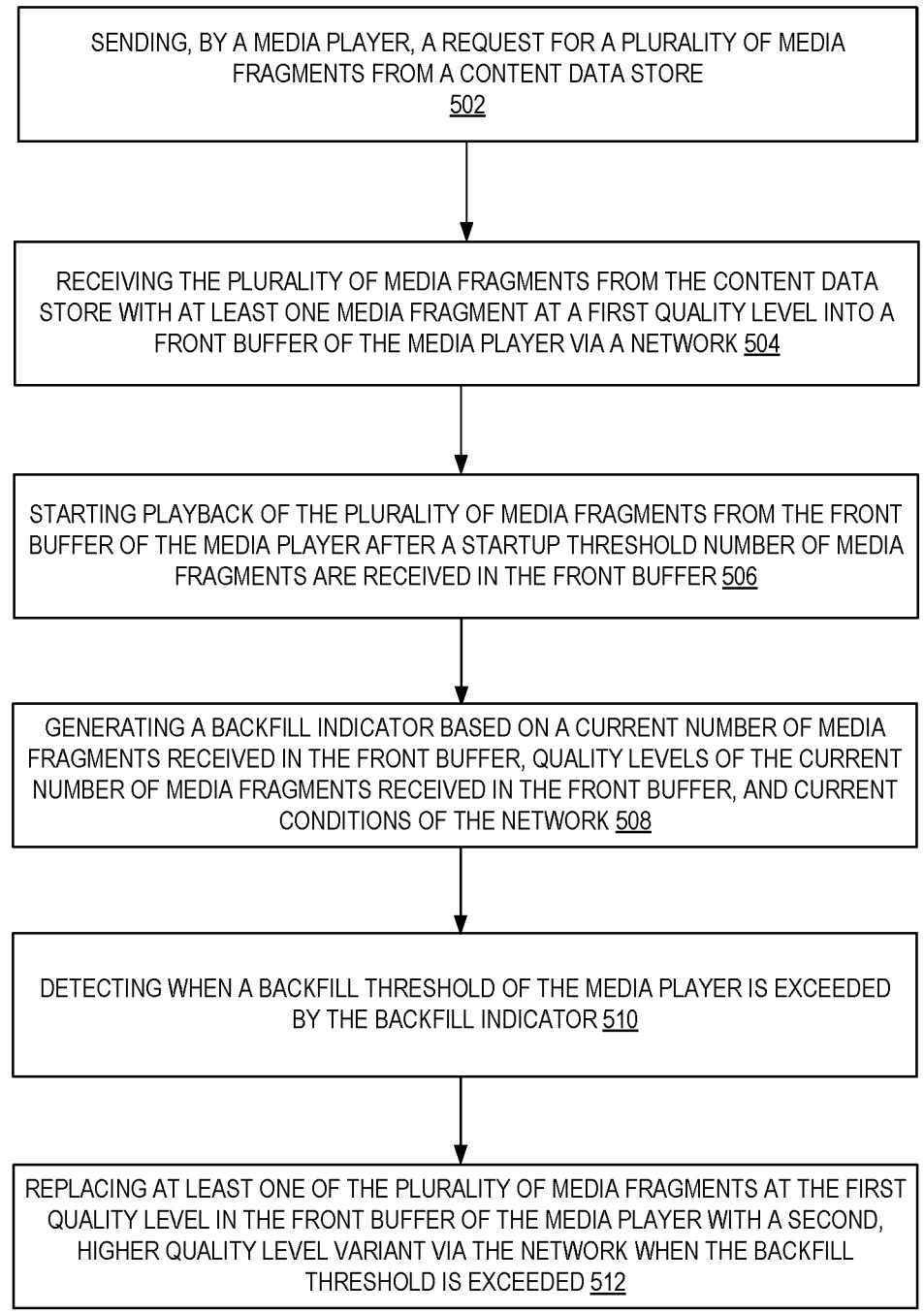
FIG. 5 is a flow diagram illustrating operations of a method for adaptive backfilling of media fragments including generating a backfill indicator according to some embodiments.

FIG. 5 is a flow diagram illustrating operations of a method for adaptive backfilling of media fragments including generating a backfill indicator according to some embodiments. Depicted flow diagram 500 includes sending, by a media player, a request for a plurality of media fragments from a content data store 502, receiving the plurality of media fragments from the content data store with at least one media fragment at a first quality level into a front buffer of the media player via a network 504, starting playback of the plurality of media fragments from the front buffer of the media player after a startup threshold number of media fragments are received in the front buffer 506, generating a backfill indicator based on a current number of media fragments received in the front buffer, quality levels of the current number of media fragments received in the front buffer, and current conditions of the network 508, detecting when a backfill threshold of the media player is exceeded by the backfill indicator 510, and replacing at least one of the plurality of media fragments at the first quality level in the front buffer of the media player with a second, higher quality level variant via the network when the backfill threshold is exceeded 512.

At least some embodiments of the disclosed technologies can be described in view of the following examples:

Example 1. A computer-implemented method comprising:
sending, by a media player, a request for a plurality of media fragments from a content data store;
receiving the plurality of media fragments from the content data store with at least one media fragment at a first quality level into a front buffer of the media player via a network;
starting playback of the plurality of media fragments from the front buffer of the media player after a startup threshold number of media fragments are received in the front buffer;
detecting when a backfill threshold of the media player is exceeded by a backfill indicator; and
replacing at least one of the plurality of media fragments at the first quality level in the front buffer of the media player with a second, higher quality level variant via the network when the backfill threshold is exceeded.

Example 2. The computer-implemented method of example 1, further comprising generating the backfill indicator based on a current number of media fragments received in the front buffer, quality levels of the current number of media fragments received in the front buffer, and current conditions of the network.

Example 3. The computer-implemented method of example 1, wherein the at least one of the plurality of media fragments at the first quality level that is replaced in the front buffer is a latest media fragment in the front buffer before other media fragments at the second, higher quality level.
Example 4. A computer-implemented method comprising:
sending, by a media player, a request for a plurality of media fragments on a network;
receiving the plurality of media fragments from the network with at least one media fragment at a first quality level into a front buffer of the media player;
starting playback of the plurality of media fragments from the front buffer of the media player after a startup threshold number of media fragments are received in the front buffer;
detecting when a backfill threshold is exceeded by a backfill indicator; and
replacing at least one of the plurality of media fragments at the first quality level in the front buffer of the media player with a second, higher quality level variant when the backfill threshold is exceeded.
Example 5. The computer-implemented method of example 4, further comprising generating the backfill indicator based on a current number of media fragments received in the front buffer, quality levels of the current number of media fragments received in the front buffer, and current conditions of the network.
Example 6. The computer-implemented method of example 4, wherein the at least one of the plurality of media fragments at the first quality level that is replaced in the front buffer is a latest media fragment in the front buffer before other media fragments at the second, higher quality level.
Example 7. The computer-implemented method of example 4, wherein the at least one of the plurality of media fragments at the first quality level that is replaced in the front buffer is an earliest media fragment in the front buffer before other media fragments at the second, higher quality level.
Example 8. The computer-implemented method of example 4, wherein the at least one of the plurality of media fragments at the first quality level that is replaced in the front buffer is a worst quality media fragment in the front buffer.
Example 9. The computer-implemented method of example 4, wherein the at least one of the plurality of media fragments at the first quality level that is replaced in the front buffer is a latest media fragment in the front buffer between a first proper subset of media fragments at the second, higher quality level and a second proper subset of media fragments at the second, higher quality level.
Example 10. The computer-implemented method of example 4, wherein the replacing the at least one of the plurality of media fragments at the first quality level in the front buffer of the media player comprises replacing a plurality of media fragments at the first quality level with second, higher quality level variants when the backfill threshold is exceeded.
Example 11. The computer-implemented method of example 10, wherein a latest media fragment of the plurality of media fragments at the first quality level is replaced first.
Example 12. The computer-implemented method of example 4, wherein the replacing comprises deleting a media fragment at the first quality level from a slot of the front buffer of the media player, and storing the second, higher quality level variant having a different encryption into the slot of the front buffer.
Example 13. The computer-implemented method of example 4, wherein the replacing comprises: sending a request for the second, higher quality level variant on the network, receiving the second, higher quality level variant from the network, deleting a media fragment at the first quality level from a slot of the front buffer of the media player, and storing the second, higher quality level variant into the slot of the front buffer.
Example 14. The computer-implemented method of example 4, further comprising, after the replacing, sending, by the media player, a request for a next media fragment after the plurality of media fragments on the network, and receiving the next media fragment from the network into the front buffer of the media player.
Example 15. A non-transitory machine readable medium that stores code that when executed by a machine causes the machine to perform a method comprising:
sending, by a media player, a request for a plurality of media fragments on a network;
receiving the plurality of media fragments from the network with at least one media fragment at a first quality level into a front buffer of the media player;
starting playback of the plurality of media fragments from the front buffer of the media player after a startup threshold number of media fragments are received in the front buffer;
detecting when a backfill threshold is exceeded by a backfill indicator; and
replacing at least one of the plurality of media fragments at the first quality level in the front buffer of the media player with a second, higher quality level variant when the backfill threshold is exceeded.
Example 16. The non-transitory machine readable medium of example 15, wherein the method further comprises generating the backfill indicator based on a current number of media fragments received in the front buffer, quality levels of the current number of media fragments received in the front buffer, and current conditions of the network.
Example 17. The non-transitory machine readable medium of example 15, wherein the at least one of the plurality of media fragments at the first quality level that is replaced in the front buffer is a latest media fragment in the front buffer before other media fragments at the second, higher quality level.
Example 18. The non-transitory machine readable medium of example 15, wherein the at least one of the plurality of media fragments at the first quality level that is replaced in the front buffer is an earliest media fragment in the front buffer before other media fragments at the second, higher quality level.
Example 19. The non-transitory machine readable medium of example 15, wherein the at least one of the plurality of media fragments at the first quality level that is replaced in the front buffer is a latest media fragment in the front buffer between a first proper subset of media fragments at the second, higher quality level and a second proper subset of media fragments at the second, higher quality level.
Example 20. The non-transitory machine readable medium of example 15, wherein the replacing comprises deleting a media fragment at the first quality level from a slot of the front buffer of the media player, and storing the second, higher quality level variant having a different encryption into the slot of the front buffer.

Figure 6:
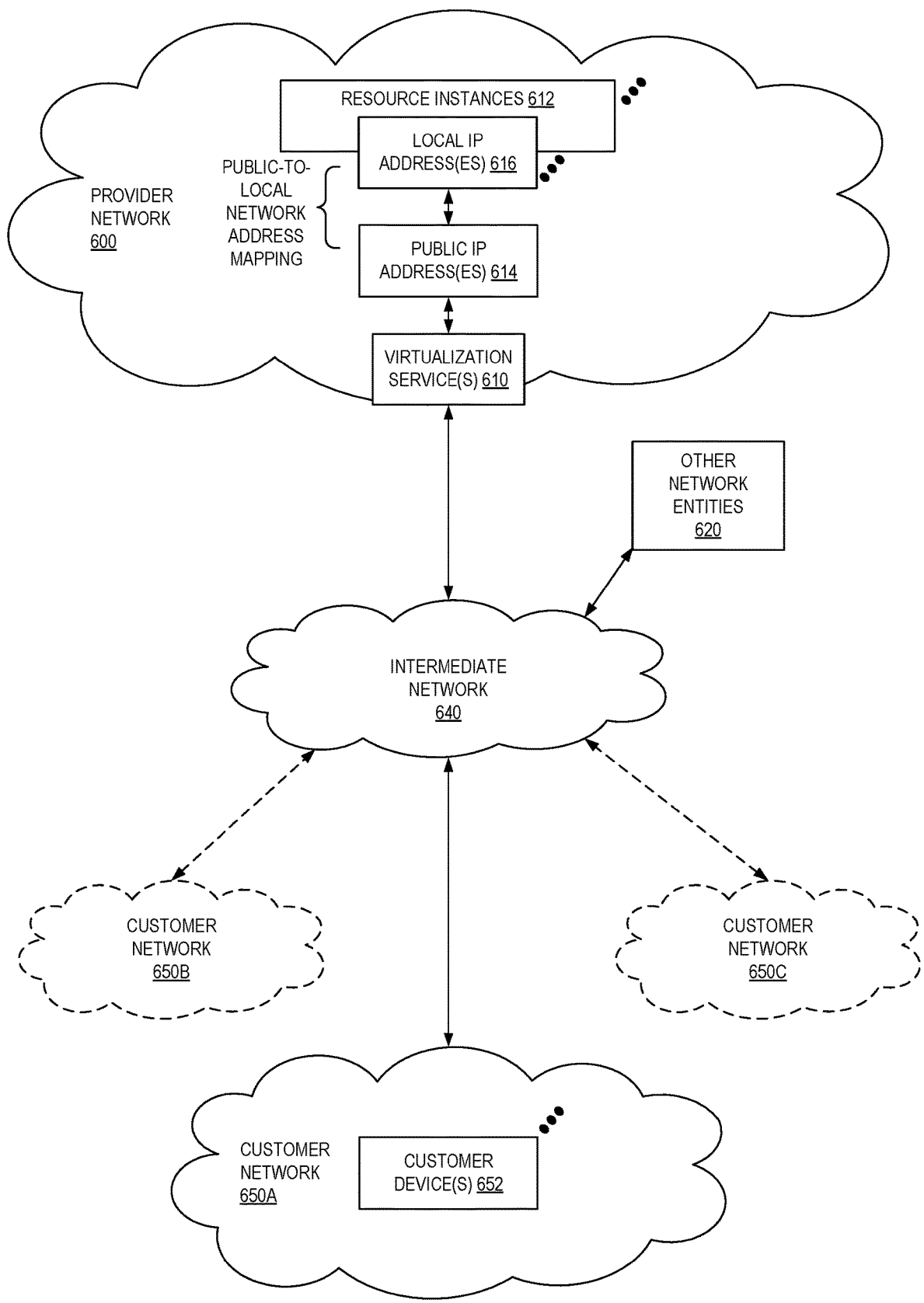
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
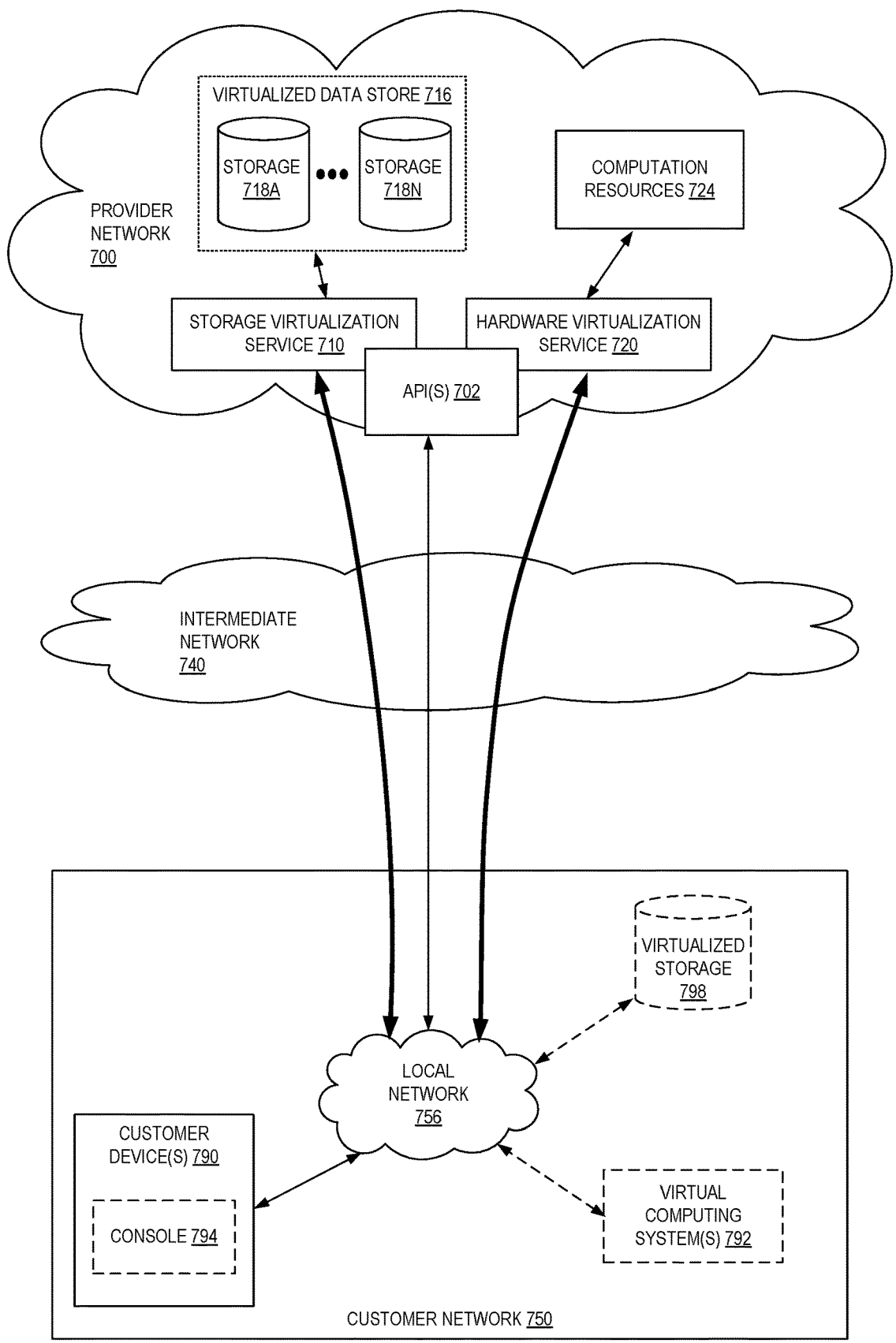
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
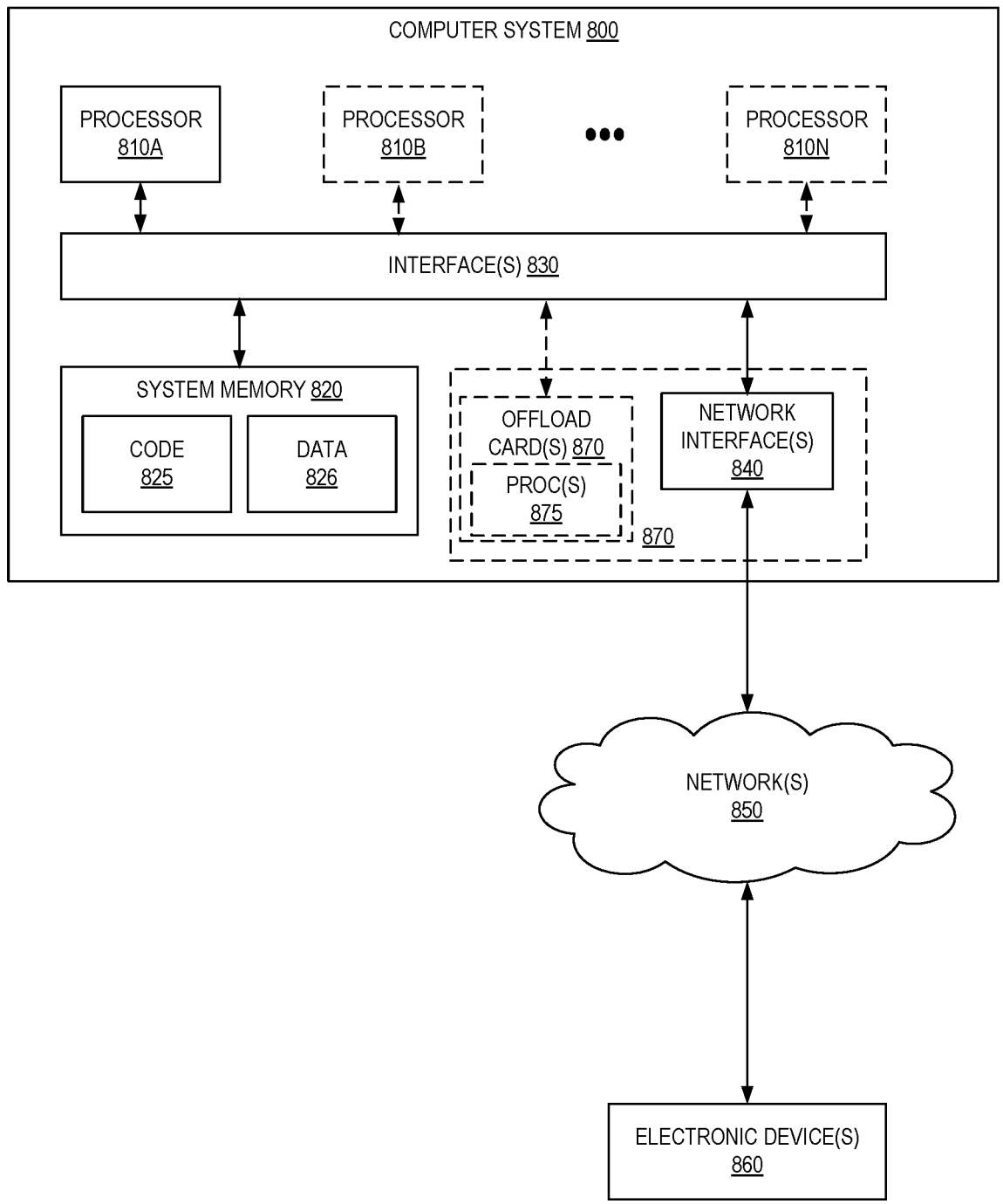
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
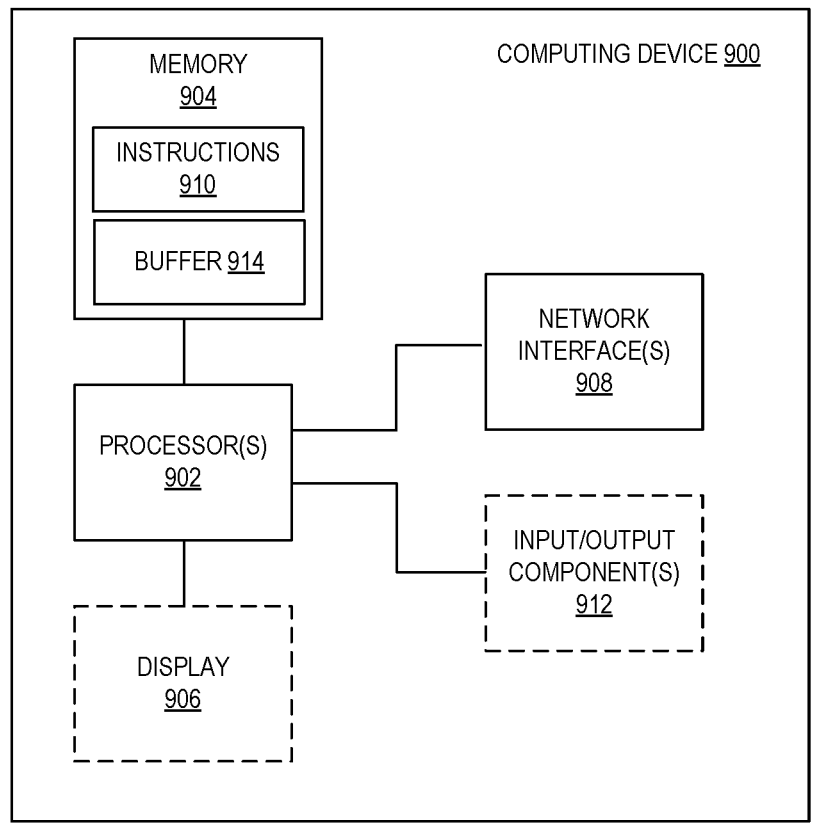
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a media player with adaptive media fragment backfilling as disclosed herein) and/or data (e.g., in (front) buffer 914), and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
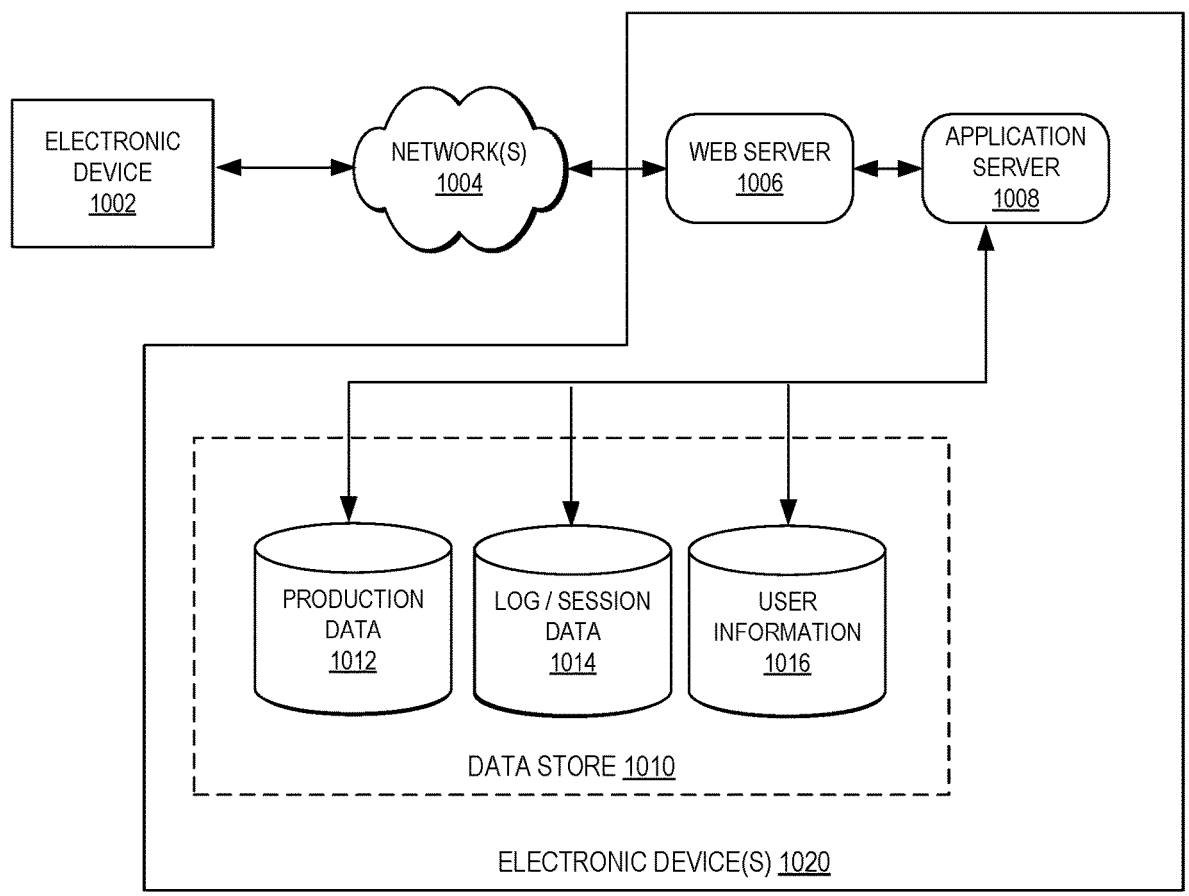
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser.

It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   sending, by a media player, a request for a plurality of media fragments from a content data store;
   receiving the plurality of media fragments from the content data store with at least one media fragment at a first quality level into a front buffer of the media player via a network;
   starting playback of the plurality of media fragments from the front buffer of the media player after a startup threshold number of media fragments are received in the front buffer;
   detecting when a backfill indicator exceeds a backfill threshold of the media player; and
   replacing at least one of the plurality of media fragments at the first quality level in the front buffer of the media player with a second, higher quality level variant via the network when the backfill threshold is exceeded, wherein the at least one of the plurality of media fragments at the first quality level that is replaced first in the front buffer is a latest media fragment of a plurality of fragments in the front buffer before other media fragments at the second, higher quality level when a fragment replacement policy is set to a first value, and the at least one of the plurality of media fragments at the first quality level that is replaced first in the front buffer is an earliest media fragment of the plurality of fragments in the front buffer before the other media fragments at the second, higher quality level when the fragment replacement policy is set to a second value.

2. The computer-implemented method of claim 1, further comprising generating the backfill indicator based on a current number of media fragments received in the front buffer, quality levels of the current number of media fragments received in the front buffer, and current conditions of the network.

3. The computer-implemented method of claim 1, further comprising reading the fragment replacement policy from the media player.

4. A computer-implemented method comprising:
   sending, by a media player, a request for a plurality of media fragments on a network;
   receiving the plurality of media fragments from the network with at least one media fragment at a first quality level into a front buffer of the media player;
   starting playback of the plurality of media fragments from the front buffer of the media player after a startup threshold number of media fragments are received in the front buffer;
   detecting when a backfill indicator exceeds a backfill threshold; and
   replacing at least one of the plurality of media fragments at the first quality level in the front buffer of the media player with a second, higher quality level variant when the backfill threshold is exceeded, wherein the at least one of the plurality of media fragments at the first quality level that is replaced first in the front buffer is a latest media fragment of a plurality of fragments in the front buffer before a media fragment at the second, higher quality level when a fragment replacement policy is set to a first value, and the at least one of the plurality of media fragments at the first quality level that is replaced first in the front buffer is an earliest media fragment of the plurality of fragments in the front buffer before the media fragment at the second, higher quality level when the fragment replacement policy is set to a second value.

5. The computer-implemented method of claim 4, further comprising generating the backfill indicator based on a current number of media fragments received in the front buffer, quality levels of the current number of media fragments received in the front buffer, and current conditions of the network.

6. The computer-implemented method of claim 4, further comprising reading the fragment replacement policy set to the first value from the media player.

7. The computer-implemented method of claim 4, further comprising reading the fragment replacement policy set to the second value from the media player.

8. The computer-implemented method of claim 4, wherein the at least one of the plurality of media fragments at the first quality level that is replaced in the front buffer is a worst quality media fragment in the front buffer.

9. The computer-implemented method of claim 4, wherein the at least one of the plurality of media fragments at the first quality level that is replaced in the front buffer is between a first proper subset of media fragments at the second, higher quality level and a second proper subset of media fragments at the second, higher quality level.

10. The computer-implemented method of claim 4, wherein the replacing the at least one of the plurality of media fragments at the first quality level in the front buffer of the media player comprises replacing a plurality of media fragments at the first quality level with second, higher quality level variants when the backfill threshold is exceeded.

11. The computer-implemented method of claim 10, wherein each next latest media fragment of the plurality of media fragments at the first quality level is replaced first when the fragment replacement policy is set to the first value.

12. The computer-implemented method of claim 4, wherein the replacing comprises deleting a media fragment at the first quality level and an encryption from a slot of the front buffer of the media player, and storing the second, higher quality level variant having a different encryption into the slot of the front buffer.

13. The computer-implemented method of claim 4, wherein the replacing comprises: sending a request for the second, higher quality level variant on the network, receiving the second, higher quality level variant from the network, deleting a media fragment at the first quality level from a slot of the front buffer of the media player, and storing the second, higher quality level variant into the slot of the front buffer.

14. The computer-implemented method of claim 4, further comprising, after the replacing, sending, by the media player, a request for a next media fragment after the plurality of media fragments on the network, and receiving the next media fragment from the network into the front buffer of the media player.

15. A non-transitory machine readable medium that stores code that when executed by a machine causes the machine to perform a method comprising:
    sending, by a media player, a request for a plurality of media fragments on a network;
    receiving the plurality of media fragments from the network with at least one media fragment at a first quality level into a front buffer of the media player;
    starting playback of the plurality of media fragments from the front buffer of the media player after a startup threshold number of media fragments are received in the front buffer;
    detecting when a backfill indicator exceeds a backfill threshold; and
    replacing at least one of the plurality of media fragments at the first quality level in the front buffer of the media player with a second, higher quality level variant when the backfill threshold is exceeded, wherein the at least one of the plurality of media fragments at the first quality level that is replaced first in the front buffer is a latest media fragment of a plurality of fragments in the front buffer before a media fragment at the second, higher quality level when a fragment replacement policy is set to a first value, and the at least one of the plurality of media fragments at the first quality level that is replaced first in the front buffer is an earliest media fragment of the plurality of fragments in the front buffer before the media fragment at the second, higher quality level when the fragment replacement policy is set to a second value.

16. The non-transitory machine readable medium of claim 15, wherein the method further comprises generating the backfill indicator based on a current number of media fragments received in the front buffer, quality levels of the current number of media fragments received in the front buffer, and current conditions of the network.

17. The non-transitory machine readable medium of claim 15, further comprising reading the fragment replacement policy set to the first value from the media player.

18. The non-transitory machine readable medium of claim 15, further comprising reading the fragment replacement policy set to the second value from the media player.

19. The non-transitory machine readable medium of claim 15, wherein the at least one of the plurality of media fragments at the first quality level that is replaced in the front buffer is between a first proper subset of media fragments at the second, higher quality level and a second proper subset of media fragments at the second, higher quality level.

20. The non-transitory machine readable medium of claim 15, wherein the replacing comprises deleting a media fragment at the first quality level and an encryption from a slot of the front buffer of the media player, and storing the second, higher quality level variant having a different encryption into the slot of the front buffer.

* * * * *